(12) United States Patent
Wang et al.

(10) Patent No.: US 9,978,370 B2
(45) Date of Patent: May 22, 2018

(54) INSERTION OF CHARACTERS IN SPEECH RECOGNITION

(71) Applicant: Lenovo (Singapore) Pte. Ltd., Singapore (SG)

(72) Inventors: Song Wang, Cary, NC (US); Jianbang Zhang, Cary, NC (US); Ming Qian, Cary, NC (US); Jian Li, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 33 days.

(21) Appl. No.: 14/815,281

(22) Filed: Jul. 31, 2015

(65) Prior Publication Data

US 2017/0032789 A1    Feb. 2, 2017

(51) Int. Cl.
*G10L 15/00* (2013.01)
*G10L 15/26* (2006.01)
*G10L 15/22* (2006.01)
*G06F 17/24* (2006.01)
*G06F 17/27* (2006.01)

(52) U.S. Cl.
CPC .............. *G10L 15/26* (2013.01); *G06F 17/24* (2013.01); *G06F 17/242* (2013.01); *G06F 17/273* (2013.01); *G10L 15/22* (2013.01); *G10L 2015/228* (2013.01)

(58) Field of Classification Search
CPC ......... G10L 15/26; G10L 15/24; G10L 15/25; G10L 15/265; G10L 15/28; G06F 17/24; G06F 17/241; G06F 17/242; G06F 17/243; G06F 17/248; G06F 17/273; G06F 17/2735; G06F 17/27

USPC .............................. 704/1–10, 270, 235, 246
See application file for complete search history.

(56) References Cited

U.S. PATENT DOCUMENTS

| | | | | |
|---|---|---|---|---|
| 5,799,273 A | * | 8/1998 | Mitchell | .................. G06F 3/16 704/235 |
| 7,260,529 B1 | | 8/2007 | Lengen | |
| 2002/0099542 A1 | * | 7/2002 | Mitchell | ............. G06F 17/2241 704/231 |
| 2004/0098444 A1 | * | 5/2004 | Bengtsson | ........... G06Q 10/109 709/200 |
| 2004/0176114 A1 | * | 9/2004 | Northcutt | .......... H04M 1/72547 455/466 |
| 2006/0253280 A1 | * | 11/2006 | Harband | ................. G10L 13/00 704/223 |
| 2008/0319742 A1 | * | 12/2008 | Da Palma | ............... G10L 15/26 704/235 |
| 2009/0187407 A1 | * | 7/2009 | Soble | .................. G06F 19/3487 704/260 |
| 2009/0216531 A1 | | 8/2009 | Yanagihara | |

(Continued)

*Primary Examiner* — Chan Park
*Assistant Examiner* — Stephen Brinich
(74) *Attorney, Agent, or Firm* — Ference & Associates LLC (57) ABSTRACT

One embodiment provides a method, including: receiving, from an audio capture device, speech input; converting, using a processor, the speech input to machine text; receiving, from an alternate input source, an input comprising at least one character; identifying, using a processor, a location associated with the machine text to insert the at least one character; and inserting, using a processor, the at least one character at the location identified. Other aspects are described and claimed.

20 Claims, 4 Drawing Sheets

(56) References Cited

U.S. PATENT DOCUMENTS

2009/0319266 A1* 12/2009 Brown ................. G06F 9/4443
704/235
2014/0278441 A1 9/2014 Ton et al.

* cited by examiner

INSERTION OF CHARACTERS IN SPEECH RECOGNITION

BACKGROUND

The portability of information handling devices ("devices") has allowed users to use devices anywhere. Some users prefer to provide input for these devices, for example, smart phones, tablets, smart watches, personal computer, laptop computers, and the like, using speech to text technology or speech recognition software. As speech to text technology has become more accurate and easier to use, users are employing the software to provide long bodies of text rather than short messages, for example, email dictations rather than short text messages. To make accurate dictations using the speech to text technology the user must provide a speech command in order to input punctuation into the body of text. For example, the user must say the word "comma" rather than typing a "," as in traditional input methods.

BRIEF SUMMARY

In summary, one aspect provides a method, comprising: receiving, from an audio capture device, speech input; converting, using a processor, the speech input to machine text; receiving, from an alternate input source, an input comprising at least one character; identifying, using a processor, a location associated with the machine text to insert the at least one character; and inserting, using a processor, the at least one character at the location identified.

Another aspect provides an information handling device, comprising: an audio capture device; a processor operatively coupled to the audio capture device; a memory device that stores instructions executable by the processor to: receive, from an audio capture device, speech input; convert, using a processor, the speech input to machine text; receive, from an alternate input source, an input comprising at least one character; identify a location associated with the machine text to insert the at least one character; and insert the at least one character at the location identified.

A further aspect provides a product, comprising: a storage device that stores code executable by a processor, the code comprising: code that receives, from an audio capture device, speech input; code that converts the speech input to machine text; code that receives, from an alternate input source, an input comprising at least one character; code that identifies, using a processor, a location associated with the machine text to insert the at least one character; and code that inserts, using a processor, the at least one character at the location identified.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Speech to text technology has become an increasingly popular way of providing input to an information handling device. The technology has become more accurate so some users prefer to provide speech input over traditional methods, for example, using a touch keyboard, conventional keyboard, keypad, mouse, and the like, even in situations where the user has the ability to provide manual input. Since users are increasingly using the technology to provide longer bodies of text, rather than short messages, the users may desire correctly punctuated bodies of text. The issue with current speech to text technology is that inputting punctuation, or other characters which are not letters, is typically done through speech command. In other words, the user has to speak the word associated with the desired punctuation, for example, "exclamation mark" rather than just typing "!". Punctuation and symbol insertion by command diction is both unnatural and disruptive to normal thought processes. Additionally, in some cases, the speech to text technology may not support the input of some characters, for example, emoticons.

One currently employed solution relies on software algorithms that predict punctuation based upon silence. In other words, if a user pauses while providing the speech input, the technology may recognize that silence as a comma or a period. The issue with this is that this method can be inaccurate. For example, if a user has started a thought but then pauses to think further, the technology may interpret this as a location for a period, but the sentence may not be finished. In an effort to assist in inaccurate placement of punctuation, some speech to text technology uses context in order to assist in eliminating this issue, but again, this tends to be inaccurate. Additionally, the punctuation chosen by the software may not be the desired punctuation of the user. For example, the user may desire an exclamation mark, but the software may instead use a period.

Another solution is to allow a user to provide input using a conventional type input method, for example, keyboard, touch keyboard, numeric pad, mouse, and the like, in conjunction with the speech to text input. However, while the current method does allow a user to provide manual input, the input can only be provided after the text has been displayed. In other words, because the speech to text technology has a delay time between the user speaking and the text appearing, in order to provide the punctuation using the manual method, the user has to wait for the text to finish appearing. This causes the user to have to wait and disrupts the train of thought, which can become very frustrating.

These technical issues present problems for users in that providing correctly punctuated bodies of text may be difficult using conventional speech to text recognition software. Conventional speech to text recognition software requires that a user provide a verbal punctuation or symbol dictation corresponding to the desired punctuation or symbol. Software algorithms that predict punctuation based on silence and word context are not always accurate. Additionally providing characters other than letters, for example, symbols, numbers, emoticons, and the like, may be difficult if not impossible with current speech to text technology. The current method for allowing a user to provide a traditional input with regard to the symbols requires the user to wait until the speech to text technology has completed processing the speech. These methods interrupt a user's thoughts and are cumbersome.

Accordingly, an embodiment provides a method of allowing a user to provide a manual input comprising at least one character while providing a speech input. One embodiment receives a speech input and starts to convert the speech input to machine text. When an embodiment receives, from an alternate input source, an input comprising at least one character, a location for the at least one character within the machine text may be identified. In one embodiment the input comprising at least one character may be received while the speech input is received. Alternatively or additionally, the input comprising the at least one character may be received while an embodiment is converting the speech to machine text.

When receiving the at least one character, an embodiment may additionally receive a time stamp associated with the at least one character. In identifying the location for the insertion of the at least one character, an embodiment may use the time stamp associated with the character and identify a corresponding time stamp within the speech input. One embodiment may, in addition to the time stamp, use context to determine the best location for the at least one character. For example, if the time stamp for receipt of the second input and the time stamp associated with the speech input do not match, an embodiment may use additional information to determine a best location of the at least one character. An embodiment may then insert the at least one character at the identified location. In addition to the placement of the character, an embodiment may provide an indication of where the character has been located within the machine text. In other words, an embodiment may allow a user to provide manual input while an embodiment is converting speech input to text, rather than requiring the user to wait until the system has finished processing the speech input.

The illustrated example embodiments will be best understood by reference to the figures. The following description is intended only by way of example, and simply illustrates certain example embodiments.

Figure 1:
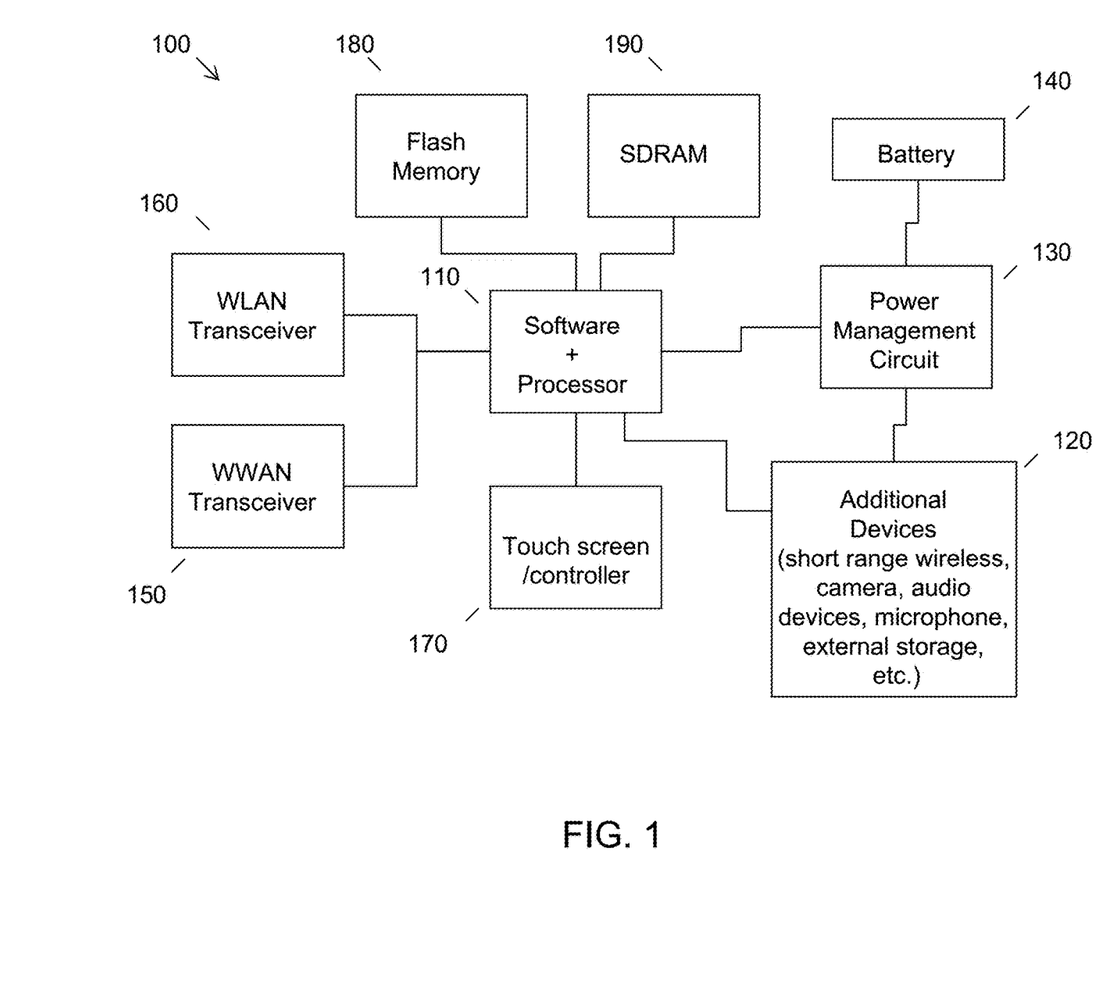
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio input device such as a microphone, an image sensor such as a camera, and the like. System 100 often includes a touch screen 170 for data input and display/rendering. System 100 also typically includes various memory devices, for example flash memory 180 and SDRAM 190.

Figure 2:
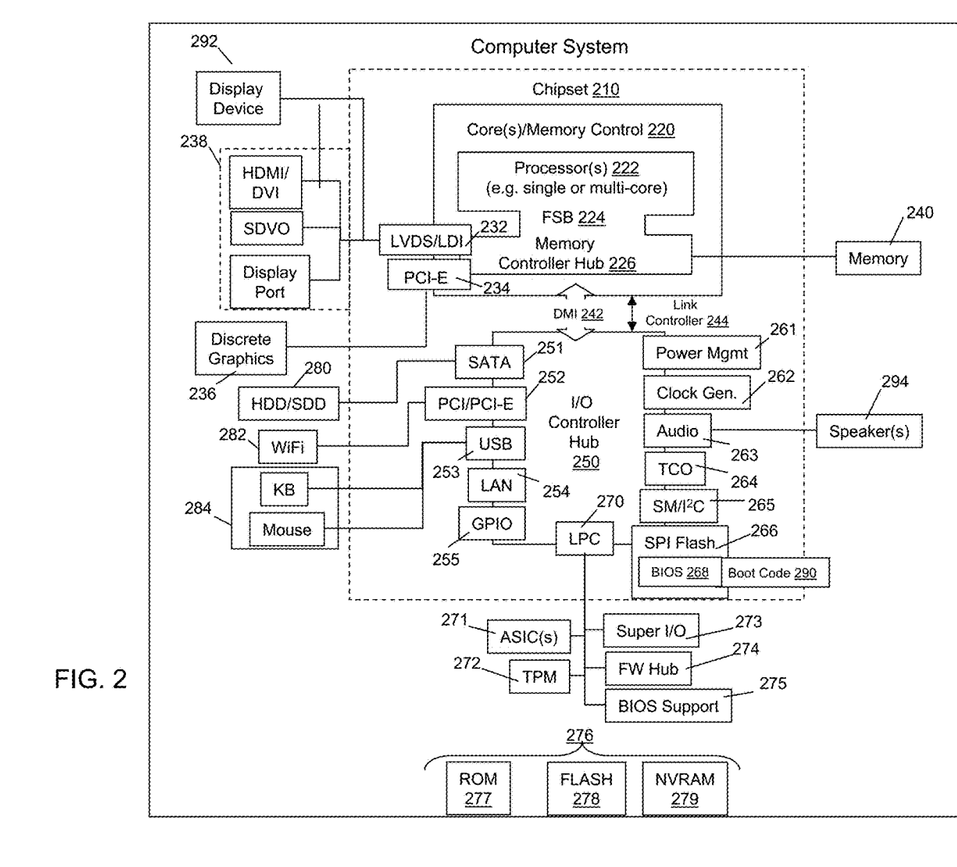
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may be used to process speech input. For example, the circuitry outlined in FIG. 1 may be implemented in a tablet or smart phone embodiment, whereas the circuitry outlined in FIG. 2 may be implemented in a personal computer embodiment.

Figure 3:
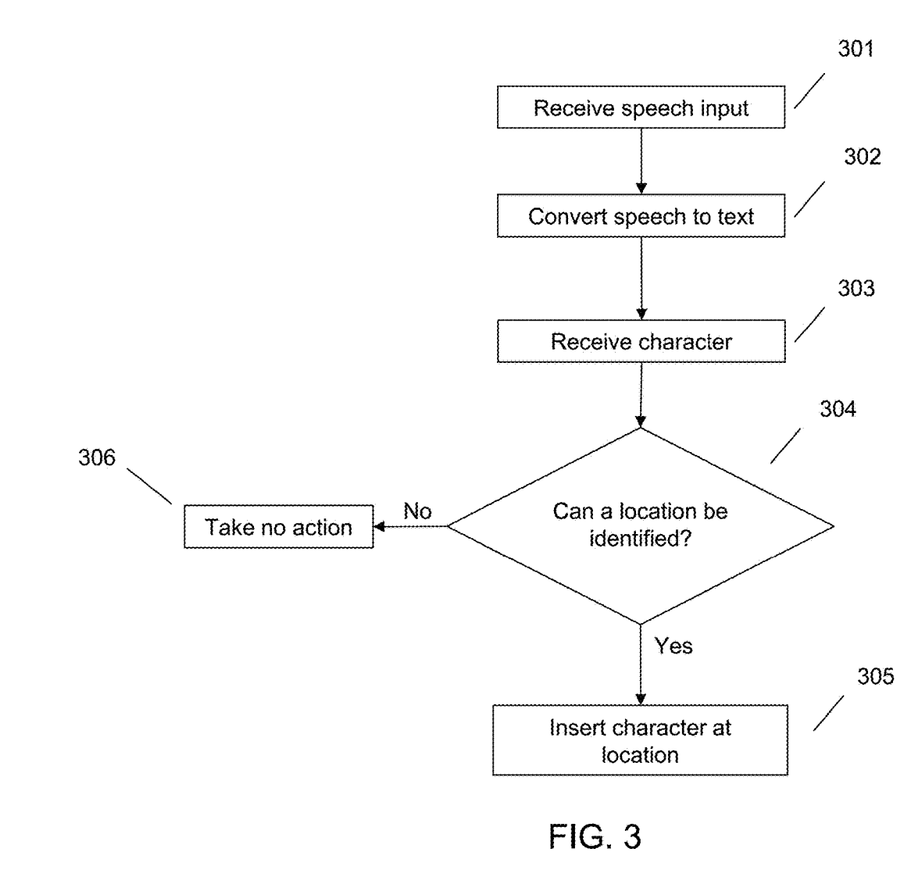
FIG. 3 illustrates an example method of insertion of characters in speech recognition.

Referring now to FIG. 3, at 301, an embodiment may receive from an audio capture device (e.g., microphone, etc.), speech input. For example, a user may be providing speech input for dictation or as a command to a device. In order to receive the speech input, the device may be running a speech to text application. As an example, the user may have selected a button which indicates to the device that the user is providing speech input to be dictated by the device. Using the speech to text technology or software, an embodiment may start converting, using a processor, the speech input to machine text at 302. The conversion may be completed using speech to text technology or software as known in the art.

At 303, an embodiment may receive, from an alternate input source (e.g., conventional keyboard, touch keyboard, number pad, mouse, etc.), an input comprising at least one character. The at least one character may comprise a letter, emoticon, number, symbol, punctuation, and the like. If a user is running a speech to text application, the provision of the character may occur while the application is still active. In other words, conventional speech to text application and software packages require that a user stop the application in order to provide input using a different method. Rather than requiring the user to stop the application, an embodiment can incorporate the provided manual input while the application or software remains active.

The input may be received while the user is providing the speech input. For example, the user may say "How are you" and then write a "?" at a touch screen input and then continue providing speech input. In other words, while providing speech input a user may, rather than providing a punctuation dictation (i.e., saying "comma") as may be required by the speech to text technology, write a "," at a touch screen input area. Alternatively or additionally, the input may be provided while the speech to text technology is converting the speech input to machine text. For example, a user may have already spoken "Hi my name is Jane", as the speech to text technology is converting the text, the user may decide they want a comma after "Hi". At the same time the speech is being converted, the user may provide a "," through a traditional keyboard.

While receiving the speech input, converting the speech to machine text, and receiving the character input, an embodiment may additionally receive or otherwise associate a time stamp with the data. For example, as the user is providing speech input an embodiment may identify a time stamp associated with each of the words or provided speech input. The time stamp may be created, identified, and/or stored locally on the device. Alternatively, the time stamp may be created, identified, and/or stored remotely, for example, on a cloud storage device.

Figure 4A:
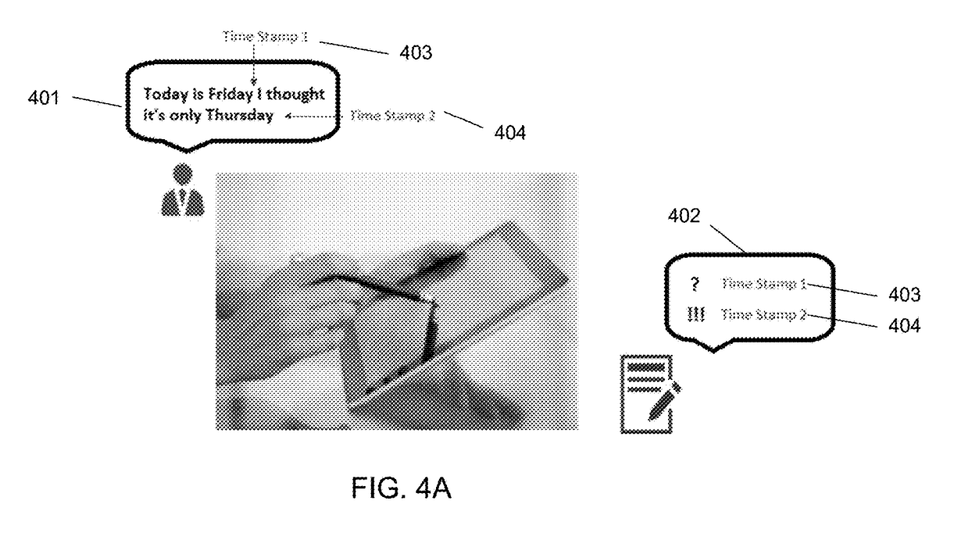
FIG. 4A-FIG. 4B illustrates an example of insertion of characters in speech recognition.

At 304, an embodiment may identify a location associated with the machine text to insert the at least one character. In one embodiment the location may be identified using the time stamp associated with the inputs provided. As an example, referring to FIG. 4A, a user may provide a speech input 401 stating "Today is Friday I thought it's only Thursday". After saying "Friday" the user may provide a manual input 402 of a "?", and after saying "Thursday" the user may provide a manual input 402 of "!!!". The manual input 402 of "?" may be associated with a first time stamp 403 which corresponds to the first time stamp 403 in the speech input 401, which is after the spoken word "Friday". The manual input 402 of "!!!" may be associated with a second time stamp 404 which corresponds to the second time stamp 404 in the speech input 401, which is after the spoken word "Thursday".

When using the time stamp for location identification, the time stamp for each input or conversion should be obtained from the same location in order to ensure that the time stamp is consistent between the inputs. For example, if the time stamp associated with the character input is received from a local storage location, the time stamp associated with the speech input should also be received from the same local storage location. However, if a local and remote storage location have synced time stamps, it is possible to pull the time stamps from multiple locations.

One embodiment may use additional characteristics of the speech and/or manual input to identify a location. As an example, one embodiment may use context characteristics associated with the speech input to identify a location for insertion of the character. This use of context characteristics may be similar to current methods of determining punctuation using speech to text technology based upon context. For example, if the user provides a manual input that does not correctly correspond to a time stamp within the speech input (e.g., the user provides the manual input a little before or after the correct location of insertion), an embodiment may use additional methods to identify the correct location of insertion of the character. If additional characteristics cause conflict between each other an embodiment may default to just using the time stamps to identify the location of insertion.

If the technology has already converted the speech to machine input, a user may still be able to provide input for character insertion. For example, if an embodiment has already converted "Are you coming" to machine text, but the user wants to add a question mark, the user can select the word "coming" and the provide a "?" input using a manual method. Selecting does not necessarily mean that the user selects the whole word, but may rather include the user moving the cursor to a desired location of insertion. In selecting the word, the user does not have to select the whole word, nor does the user need to move the cursor to the exact spot of insertion. For example, the user does not have to place the cursor at the end of "coming" rather the user can just touch the word "coming" and an embodiment may determine that the most logical place of insertion is at the end of the word rather than the middle.

The provision of the input may occur after the user has stopped providing speech input, or may occur while the user continues to provide speech input. For example, the user may say "Are you coming" and continue to speak while selecting the word "coming" and providing the "?" input. In other words, the user does not have to stop the speech to text application in order to provide the additional input. This can also be used to correct an improperly converted speech input. For example, a user may which to end a sentence with "?!?" but the system has only provided a "?". The user may select the "?" and provide the additional input to modify the machine text.

If, at 304, an embodiment cannot identify a location of insertion for the character, an embodiment may take no action at 306. Alternatively, an embodiment may notify the user that a location cannot be identified, and allow the user to provide the correct location for the insertion of the character. This may also occur if an embodiment cannot correct determine the character that the user has provided. For example, if an embodiment cannot determine whether the user provided a ";" or a smiley face emoticon, an embodiment may take no action at 306 or may prompt the user for additional input.

Figure 4B:
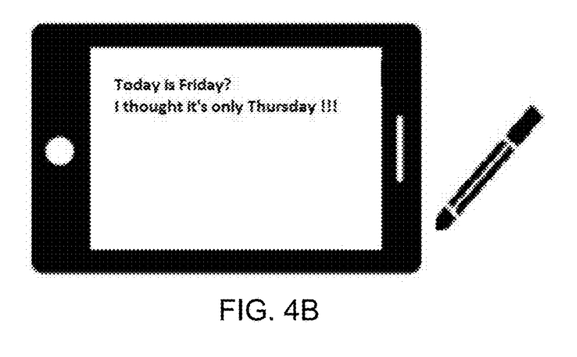

However, if an embodiment can identify a location at 304, an embodiment may, at 305, insert the at least one character at the location identified. For example, referring to FIG. 4B, after identifying the location of the manual input as explained in connection with FIG. 4A, an embodiment may insert the characters into the machine text and result in the output as shown in FIG. 4B. When using a touch input, after an embodiment has inserted the characters into the machine text, the written character provided by the user may be removed from the touch surface and/or touch display.

An embodiment may additionally provide a notification to the user that the character has been inserted. For example, an embodiment may highlight the character, change the color of the character, circle the character, or otherwise provide an indication of the inserted character. An embodiment may additionally allow a user to confirm the location of the character. Upon receiving no user input regarding the location of the character, an embodiment may maintain the location of the character. Alternatively, an embodiment may remove the character insertion. This action (i.e., whether the character location is maintained or removed) may be set by default within the system or may be provided by the user.

The various embodiments described herein thus represent a technical improvement to conventional speech to text technologies. Using the techniques described herein, a user can provide manual input at the same time as speech input or while the system is converting from the speech input to machine text. Thus, using the methods and systems described herein, a user can provide a more natural and less disruptive way of augmenting speech input with symbols, emoticons, punctuation, numbers, letters, and other characters while using speech to text technology.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, from an audio capture device, speech input;
converting, using a processor, the speech input to machine text;
receiving, from an alternate input source, a non-speech input comprising at least one character, wherein the non-speech input is received during at least one of: the receiving the speech input and the converting the speech input to machine text and wherein the receiving a non-speech input comprises generating a time stamp associated with the non-speech input when the non-speech input is received;
generating a time stamp within the speech input corresponding to the time stamp of receipt of the non-speech input;
identifying, using a processor, a location associated with the machine text to insert the at least one character, wherein the identifying a location comprises identifying generated time stamp within the speech input corresponding to the time stamp associated with the non-speech input; and
inserting, using a processor, the at least one character at the location identified.

2. The method of claim 1, wherein the receiving a non-speech input occurs while converting the speech input to machine text.

3. The method of claim 1, wherein the receiving a non-speech input occurs while receiving the speech input.

4. The method of claim 1, wherein the identifying further comprises identifying a location based upon context characteristics of the speech input.

5. The method of claim 1, wherein the time stamp associated with the non-speech input and the corresponding time stamp within the speech input are received from a single source.

6. The method of claim 1, wherein the speech input is received using speech recognition software and wherein the speech recognition software remains active while the non-speech input comprising at least one character is received.

7. The method of claim 1, wherein the receiving a non-speech input comprises receiving non-speech input from a touch input source.

8. The method of claim 1, further comprising displaying the at least one character at the location identified and a notification indicating the at least one character has been inserted at the location.

9. The method of claim 1, wherein the non-speech input is selected from the group consisting of: punctuation, emoticons, numbers, letters, and symbols.

10. The method of claim 1, wherein the non-speech input is received during the converting the speech input to machine text.

11. The method of claim 1, further comprising providing a notification to a user that the at least one character has been inserted at the location identified.

12. An information handling device, comprising:
an audio capture device;
a processor operatively coupled to the audio capture device;
a memory device that stores instructions executable by the processor to:
receive, from an audio capture device, speech input;
convert, using a processor, the speech input to machine text;
receive, from an alternate input source, a non-speech input comprising at least one character, wherein the non-speech input is received during at least one of: the receiving the speech input and the converting the speech input to machine text and wherein to receive a non-speech input comprises receiving a time stamp associated with the non-speech input;
identify a location associated with the machine text to insert the at least one character, wherein to identify a location comprises identifying a corresponding time stamp within the speech input; and
insert the at least one character at the location identified.

13. The information handling device of claim 12, wherein to receive a non-speech input occurs while converting the speech input to machine text.

14. The information handling device of claim 12, wherein to receive the non-speech input occurs while receiving the speech input.

15. The information handling device of claim 12, wherein to identify further comprises identifying a location based upon context characteristics of the speech input.

16. The information handling device of claim 12, wherein the time stamp associated with the non-speech input and the corresponding time stamp within the speech input are received from a single source.

17. The information handling device of claim 12, wherein the speech input is received using speech recognition software and wherein the speech recognition software remains active while the non-speech input comprising at least one character is received.

18. The information handling device of claim 12, wherein to receive a non-speech input comprises receiving non-speech input from a touch input source.

19. The information handling device of claim 12, wherein the instructions are further executable by the processor to display the at least one character at the location identified and a notification indicating the at least one character has been inserted at the location.

20. A product, comprising:
a storage device that stores code executable by a processor, the code comprising:
code that receives, from an audio capture device, speech input;
code that converts the speech input to machine text;

code that receives, from an alternate input source, a non-speech input comprising at least one character, wherein the non-speech input is received during at least one of: the receiving the speech input and the converting the speech input to machine text and wherein the code that receives a non-speech input comprises receiving a time stamp associated with the non-speech input;

code that identifies, using a processor, a location associated with the machine text to insert the at least one character, wherein the code that identifies a location comprises identifying a corresponding time stamp within the speech input; and code that inserts, using a processor, the at least one character at the location identified.

* * * * *